US005489356A

United States Patent [19]

Drower

[11] Patent Number: 5,489,356

[45] Date of Patent: Feb. 6, 1996

[54] METHOD OF MANUFACTURING A SECURE IDENTIFICATION CARD

[75] Inventor: Herbert M. Drower, Wilmette, Ill.

[73] Assignee: Transilwrap Company, Inc., Chicago, Ill.

[21] Appl. No.: 258,716

[22] Filed: Jun. 13, 1994

[51] Int. Cl.[6] .................... B32B 31/00

[52] U.S. Cl. .................... 156/269; 156/302; 283/107

[58] Field of Search .................... 283/107, 108, 283/109, 112, 904; 156/250, 257, 258, 269, 302, 303

[56] References Cited

U.S. PATENT DOCUMENTS 3,716,439 2/1973 Maeda .................... 283/109
5,058,926 10/1991 Drower .

*Primary Examiner*—David P. Bryant
*Attorney, Agent, or Firm*—Dorn, McEachran Jambor & Keating

[57] ABSTRACT

A method of manufacturing a secure identification card utilizing a preassembled card core. The card core includes a base layer of a tamper and wear resistant material and an image receiving layer. A series of clear, tough panels each of predetermined dimensions similar to the dimensions of a card core are formed in a roll of laminate film with each panel held to the roll by frangible corners. A card core is moved into registry with a panel on the roll of laminate film with the image receiving layer of the card core contacting a layer of heat sealable material on the panel. The card core is heat tacked to the panel to maintain both in registry. The tacked card core and panel are laminated to form a secure identification card. The secure identification card is removed from the roll of laminate by breaking the frangible corners.

2 Claims, 1 Drawing Sheet

13
15
17
19
21
23
25
27
29
31
32
33
35
37

METHOD OF MANUFACTURING A SECURE IDENTIFICATION CARD

BACKGROUND AND SUMMARY OF THE INVENTION

This invention is directed to a method of manufacturing a secure identification card having a preassembled core and at least one tamper and wear-resistant covering panel for at least the image side of the core.

In the past, the clear, tough, laminating film used as the outer covering of a secure identification card has been cut into panels each having the same shape and usually, but not always, the same dimensions as that of the preassembled core. A panel of the laminating film was positioned against the image side of the preassembled core and the preassembled core and the laminating panel were laminated under heat and pressure to form a secure identification card. Accurate alignment of the outer panel of laminating film with the preassembled core in practicing this prior method was labor intensive and, therefore, costly.

Therefore, an object of this invention is a method which permits the use of a preassembled core of a secure identification card and an accurately aligned attachment of a tamper and wear-resistant panel to at least the image side of the core and sometimes to both sides.

Another object of this invention is the accurate alignment of a tamper and wear-resistant film panels to preassembled cores by forming the film panels in a continuous roll of laminating film and retaining the panels attached to the roll of film by partially cutting the outlines of each laminating film panel without completely severing the panel from the roll of laminating film.

Another object of this invention is to facilitate the alignment of a preassembled core with a film panel by moving the preassembled core into alignment with a laminate panel which is still attached to the roll of film in which it was formed by a plurality of frangible bridges.

Another object of this invention is to maintain alignment of a laminate panel with a preassembled core prior to lamination by heat tacking the preassembled core to the laminate panel while the laminate panel is still attached to the continuous roll of laminate film.

BRIEF DESCRIPTION OF THE DRAWINGS

The invention is illustrated more or less diagrammatically in the following drawings wherein.

DESCRIPTION OF THE PREFERRED EMBODIMENT

Figures 1, 2, 3, 4, 5:
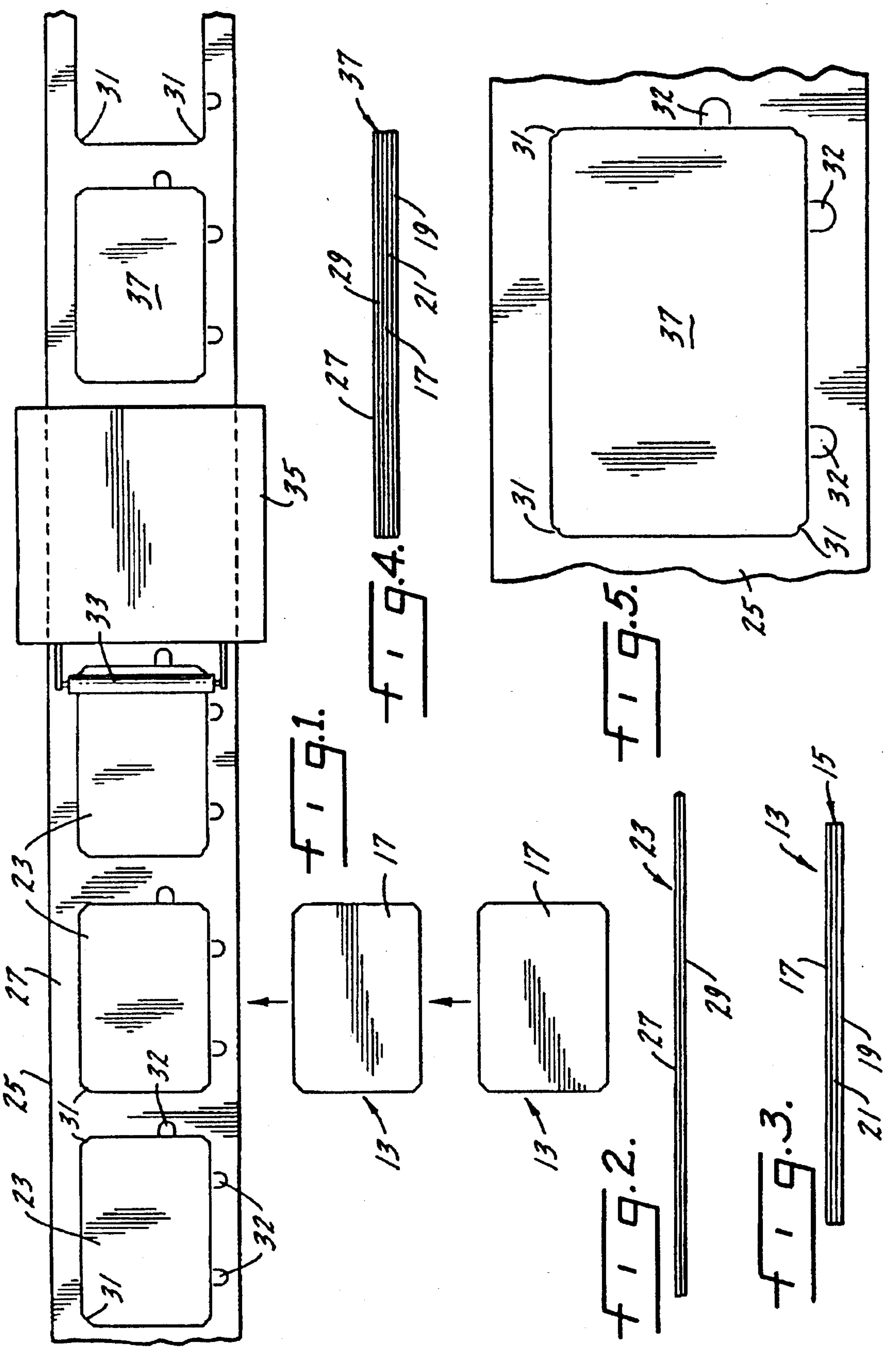
FIG. 1 is a schematic view of the method of this invention for laminating a secure identification card.
FIG. 2 is an edge elevational view of the continuous roll of laminating film shown in FIG. 1.
FIG. 3 is an edge elevational view of the preassembled identification card core of this invention shown in FIG. 1 of the drawings.
FIG. 4 is an edge elevational view of the secure identification card made in accordance with the method of this invention.
FIG. 5 is an enlarged partial view of a secure identification card after lamination but before separation from the roll of laminate.

FIGS. 1 and 3 of the drawings show a card core 13 which is used in practicing the method of this invention. The card cores 13 may be formed contemporaneously with the practice of the method of this invention or they may be preassembled. Each card core 13 is formed to predetermined dimensions. The card core, as seen in FIG. 3, includes a base 15 of a transparent resin having an image receiving surface 17 formed on one side thereon. The base may consist of an outer sheet 19 of a hard, tough, abrasion-resistant material such as polyester film and an inner layer 21 of a heat and pressure sealable polyethylene. The inner layer 21 attaches to the image receiving surface 17. The image receiving layer 17 may be a piece of photographic paper or it may be a photographic emulsion to which identification data image may be applied photographically. Further, the image receiving layer 17 may be constituted to receive an image formed by a multi-color laser printer, an ink jet printer or a diffusion dye printer, all of which may be controlled by a suitable computer to provide a computer generated image on the layer 17.

A series of aligned and longitudinally spaced apart, clear, tough, panels 23 are formed in a roll 25 of a transparent material. Each panel 23 is formed to predetermined dimensions which are essentially the same in length and width as similar dimensions of the card core 13. The roll 25 may consist of an outer film 27 of a hard, tough, abrasion-resistant polyester film laminated to an inner film 29 of a heat sealable polyethylene resin. The panels 23 are formed in the roll 25 by being die cut or otherwise precision cut and are maintained in an attached relation to the film by frangible bridge corners 31. Tabs 32 may also be die cut or otherwise precision formed in the roll 25 of transparent material through die cutting techniques or otherwise to provide indexing means for the roll of transparent material.

Each card core 13 is brought into registry with one of the laminate panels 23 while the laminate panel is still attached to the roll 25 by its frangible bridge corners 31 with the image receiving surface 17 of the card core engaging the heat and pressure sensitive polyethylene layer 29 of the wear-resistant panel 23. The core 13 and wear-resistant panel 23 are heat tacked together by a heated roller 33 in order to maintain them in alignment until they are passed through the laminating machine 35 where they are permanently laminated by the application of heat and pressure to form an identification card 37. The roll 25 and the attached card 37 are then moved out of the laminating machine where the completed secure identification card 37 can be removed from the roll 25 by breaking the frangible bridge corners 31.

It may be desirable under some circumstances to separate the secure identification card 37 from the roll 25 after the heat tacking by the roller 33 and before the final lamination is accomplished in the laminating machine 35. However, the tacking accomplished by roller 33 will maintain the parts of the secure identification card 37 in alignment throughout the laminating process.

I claim:

1. A method of manufacturing a secure identification card of given dimensions, including the steps of:

forming a card core having predetermined dimensions with said card core having a base layer of a transparent resin material and an image receiving layer affixed to one side of said base layer, forming a series of card panels each of predetermined dimensions which are essentially identical to said predetermined dimensions of said card core in an elongated roll of transparent resin with each of said panels held to said roll by a plurality of frangible bridges, moving a card core into registry with a card panel with the image receiving layer of said card core contacting said card panel, temporarily fastening said card core and said card panel to each other to maintain them in registry, laminating said card core and said card panel to each other to form a secure identification card, and detaching said secure identification card from said roll by breaking said frangible bridges.

2. A method of manufacturing a secure identification card of predetermined dimensions using a preassembled card core of predetermined dimensions having a base layer of a transparent resin material and an image receiving layer affixed to one side of said base layer, said method including the steps of:

forming a series of card panels each of predetermined dimensions which are essentially identical to said predetermined dimensions of said card core in an elongated roll of transparent resin with each of said panels held to said roll by a plurality of frangible ridges, moving a card core into registry with a card panel with the image receiving layer of said card core contacting said card panel, temporarily fastening said card core and said card panel to each other to maintain them in registry, laminating said card core and said card panel to each other to form a secure identification card, and detatching said secure identification card from said roll by breaking said frangible bridges.

* * * * *